(12) United States Patent
Joung et al.

(10) Patent No.: US 9,497,702 B2
(45) Date of Patent: Nov. 15, 2016

(54) METHOD OF CONTROLLING POWER OF PHYSICAL LAYER DEVICE OF BASE STATION IN MOBILE COMMUNICATION SYSTEM

(71) Applicant: INNOWIRELESS CO., LTD., Gyeonggi-do (KR)

(72) Inventors: Jin Soup Joung, Gyeonggi-do (KR); Seung Hwan Ji, Gyeonggi-do (KR); Myung Jong Kim, Gyeonggi-do (KR); Seung Hwan Lee, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 109 days.

(21) Appl. No.: 14/629,441

(22) Filed: Feb. 23, 2015

(65) Prior Publication Data

US 2016/0192290 A1   Jun. 30, 2016

(30) Foreign Application Priority Data

Dec. 26, 2014   (KR) ........................ 10-2014-0190900

(51) Int. Cl.
*H04W 4/00* (2009.01)
*H04W 52/02* (2009.01)
*H04W 24/08* (2009.01)
*H04W 84/04* (2009.01)

(52) U.S. Cl.
CPC ......... *H04W 52/0206* (2013.01); *H04W 24/08* (2013.01); *H04W 84/042* (2013.01)

(58) Field of Classification Search
CPC .................................................... H04W 88/06
USPC .......................................................... 370/328
See application file for complete search history.

(56) References Cited

U.S. PATENT DOCUMENTS

| 8,738,068 | B2* | 5/2014 | Kim ................ | H04B 7/0617 455/127.1 |
|---|---|---|---|---|
| 2006/0121952 | A1* | 6/2006 | Kimura ............. | H04W 52/0283 455/572 |
| 2015/0058409 | A1* | 2/2015 | Wang ................ | H04L 67/06 709/203 |
| 2015/0334675 | A1* | 11/2015 | Cho ................. | H04W 24/02 455/435.1 |

FOREIGN PATENT DOCUMENTS

| KR | 1020120068298 A | 6/2012 |
|---|---|---|
| KR | 1020040084852 A | 10/2014 |

* cited by examiner

*Primary Examiner* — Shripal Khajuria
(74) *Attorney, Agent, or Firm* — Kaplan Breyer Schwarz & Ottesen, LLP

(57) ABSTRACT

A method of controlling power of a physical layer device of a base station in a mobile communication system which is applied to a fifth generation (5G), that is the next generation, mobile communication system and makes it possible to efficiently control the power of physical layer devices managing each beam spot, such as a radio frequency (RF) module and a modem, according to the number of pieces of user equipment (UE) or an amount of traffic processed by the beam spot. The method is applied to a mobile communication system including a plurality of media access control processing units (MACs) corresponding to a plurality of modems on a one-to-one basis and the plurality of modems each connected with one or more RF modules covering beam spots dividing a base station cell.

10 Claims, 14 Drawing Sheets

METHOD OF CONTROLLING POWER OF PHYSICAL LAYER DEVICE OF BASE STATION IN MOBILE COMMUNICATION SYSTEM

CROSS-REFERENCE TO RELATED APPLICATION

This application claims priority to and the benefit of Korean Patent Application No. 10-2014-0190900, filed on Dec. 26, 2014, the disclosure of which is incorporated herein by reference in its entirety.

FIELD OF THE INVENTION

The present invention relates to a method of controlling power of a physical layer device of a base station in a mobile communication system, and more particularly, to a method of controlling power of a physical layer device of a base station in a mobile communication system which is applied to a fifth generation (5G), that is the next generation, mobile communication system and makes it possible to efficiently control the power of physical layer devices managing each beam spot, such as a radio frequency (RF) module and a modem, according to the number of pieces of user equipment (UE) or an amount of traffic processed by the beam spot.

BACKGROUND OF THE INVENTION

Currently, the International Telecommunication Union-Radio communication sector (ITU-R) is developing a vision of various convergence services based on a 5G network. Also, the South Korean government established a development strategy for the future mobile communication industry in January 2014, and selected a future social network service (SNS), mobile three-dimensional (3D) imaging service, intelligent service, super high-speed service, and ultra high-definition (UHD) imaging/hologram service as five key services.

In addition to this, the European Union, China, Japan, South Korea, etc. established a task force for discussing a 5G network and service, and are discussing a user-oriented 5G service reflecting the lifestyle of 2020, which is the target time of commercializing 5G, in tandem with an innovation of mobile communication technology for providing an ultra high transmission rate of gigabytes per second to users.

Internationally, 5G requirements and technology standards have not yet been determined, but the requirements are expected to be determined for about five different aspects.
- Ultra high speed & low latency: 1000 times the speed of Long Term Evolution (LTE), a ultra-low latency response time of less than a few milliseconds, and realistic content
- Massive/seamless connectivity: accommodation of 1000 times as many devices and traffic, and ensuring seamless connectivity
- Intelligent/flexible network: provision of a software-based structure, real-time data analysis, and intelligent/personalized services
- Reliable/secure operation: network availability/reliability of equal to or more than 99%, and self-healing/reconfiguration
- Energy/cost-efficient infrastructure: 50 to 100 times the energy efficiency of LTE, and a reduction in the cost of infrastructure/devices In 5G mobile communication, for high-capacity transmission, a study is being conducted on the use of a millimeter wave band in which it is easy to ensure a continuous wide bandwidth of a minimum of 500 MHz or more, for example, extremely high frequency (EHF) bands of 27 to 29 GHz and 70 to 80 GHz, but an agreement has not yet been reached. In these EHF bands, it is possible to highly increase the density of antennas. Therefore, when the physical size of an antenna is determined, the interval between radiators constituting an antenna is reduced with an increase of a frequency, and thus an increased number of radiators can be included.

A plurality of radiators serve as the hardware basis of 3D beamforming technology for generating antenna beams in various shapes by controlling the magnitude and the phase of an RF signal and massive multiple-input multiple-output (MIMO) technology which enables multiple transmissions. In this way, it is expected that the 3D beamforming technology for configuring an optimal RF environment and performing high-speed transmission by controlling electric field strength vertically or horizontally according to the distribution of users or by forming several beams and beam switching/tracking technology for providing an optimal link by selecting an optimal beam from among several beams or by changing the beam direction of an antenna according to the location of a user will be actively applied to 5G mobile communication.

FIG. 1 is a diagram showing a configuration of a base station that is applicable to 5G mobile communication. As shown in FIG. 1, a mobile communication cell managed by one base station can be divided into three sectors A, B, and C. Each sector can be divided into a plurality of, for example, 16, beam spots, and RF modules, which have beam antennas to process an analog signal, which can be configured to correspond to the beam spots, on a one-to-one basis.

FIG. 2 shows a connection relationship between media access control (MAC) processing units (simply referred to as "MACs" below) and modems in 5G mobile communication. As shown in FIG. 2, according to 5G mobile communication, a total of 16 beam spots dividing each sector of a mobile communication cell correspond to RF modules which have beam antennas to process an analog signal on a one-to-one basis. The RF modules correspond to modems which perform baseband signal processing, for example, channel coding/decoding, digital modulation/demodulation, multi-antenna processing, and generation of an orthogonal frequency division multiplexing (OFDM) signal, on a one-to-one basis, and the modems also can correspond to MACs which perform mapping between logical channels and transmission channels, error correction, and distribution of time and frequency resources to a plurality of pieces of UE on a one-to-one basis.

Assuming that the physical devices which correspond to the beam spots on a one-to-one basis also correspond to the MACs on a one-to-one basis as indicated by dotted lines in FIG. 2, even when there are little or no UE at a specific beam spot, the corresponding physical layer device needs to be kept turned on at all times. Therefore, energy efficiency is low, and it is difficult to meet the aforementioned 5G requirements.

This work was supported by the Giga KOREA project of MSIP/Giga KOREA Foundation, Republic of Korea. [GK14N0100, Development of millimeter wave-based 5G mobile communication system]

RELATED DOCUMENTS

1. Korean Patent Publication No. 10-2004-0084852
2. Korean Patent Publication No. 10-2012-0068298

SUMMARY OF THE INVENTION

The present invention is directed to a method of controlling power of a physical layer device of a base station in a mobile communication system which is applied to a fifth generation (5G), that is the next generation, mobile communication system and makes it possible to efficiently control the power of physical layer devices managing each beam spot, such as a radio frequency (RF) module and a modem, according to the number of pieces of user equipment (UE) or an amount of traffic processed by the beam spot.

According to an aspect of the present invention, there is provided a method of controlling the power of a physical layer device of a base station in a mobile communication system including a plurality of MACs corresponding to a plurality of modems on a one-to-one basis and the plurality of modems each connected with one or more RF modules covering beam spots dividing a base station cell, the method including: operation (a) of checking, by each MAC, information relating to UE traffic managed by the MAC, and determining whether or not a physical layer device managed by the MAC satisfies a power-off condition based on a result of the checking; operation (b) of receiving, by an arbitrary MAC determined in operation (a) to satisfy the power-off condition, information relating to traffic managed by adjacent MACs from the adjacent MACs, and determining whether or not there is an MAC capable of covering based on the received information; and operation (c) of, when it is determined in operation (b) that there is an MAC capable of covering, requesting, by the MAC satisfying the power-off condition, the MAC capable of covering to cover a beam spot managed by the MAC satisfying the power-off condition, and then turning off power of a physical layer device managed by the MAC satisfying the power-off condition. The MAC requested to cover the beam spot in operation (c) adjusts a beam antenna angle of an RF module managed by the MAC requested to cover the beam spot so that a beam antenna of the RF module is directed toward the beam spot for which the request has been made.

In the above-described configuration, the physical layer device whose power is turned off in operation (c) may include an RF module and a modem.

Operation (a) may include determining whether or not the power-off condition is satisfied in consideration of only a total amount of traffic or both a number of pieces of UE and the total amount of traffic, and the information relating to the UE traffic may include the number of pieces of UE and the total amount of traffic of all the pieces of UE.

Operation (b) may include determining whether or not there is an MAC capable of covering in consideration of only a total amount of traffic managed by the adjacent MACs or both a number of pieces of UE and the total amount of traffic managed by the adjacent MACs.

Operation (b) may include: determining whether or not there is an MAC capable of covering according to whether or not a total amount of traffic is smaller than a coverable traffic-amount reference value; and determining an MAC managing a smallest number of pieces of UE as the MAC capable of covering when there are two or more MACs capable of covering.

Operation (c) may further include, after requesting the MAC capable of covering to cover the beam spot, gradually reducing, by the covering-requesting MAC, intensity of an RF beam output from an RF module managed by the covering-requesting MAC, and then performing beam switching.

Operation (c) may include performing, by the covering-requesting MAC, the beam switching when a difference between the intensity of the RF beam output from the RF module managed by the covering-requesting MAC and intensity of an RF beam output from an RF module managed by the MAC requested to cover the beam spot exceeds a threshold.

The adjacent MACs may be MACs managing beam spots on front, rear, left, and right sides of beam spots of the adjacent MACs.

Operation (c) may further include, turning off, by the MAC satisfying the power-off condition, the power of the physical layer device managed by the MAC satisfying the power-off condition, and then switching to a sleep mode.

When a total amount of traffic managed by the MAC requested to cover the beam spot exceeds a plurally covering traffic-amount reference value, the MAC requested to cover the beam spot may notify the covering-requesting MAC that beam switching will be performed, and then adjust the beam antenna angle of the RF module managed by the MAC requested to cover the beam spot to an angle before the covering, and the covering-requesting MAC may turn on the power of the physical layer device managed by the covering-requesting MAC after being notified that beam switching will be performed.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

A method of controlling the power of a physical layer device of a base station in a mobile communication system according to an exemplary embodiment of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
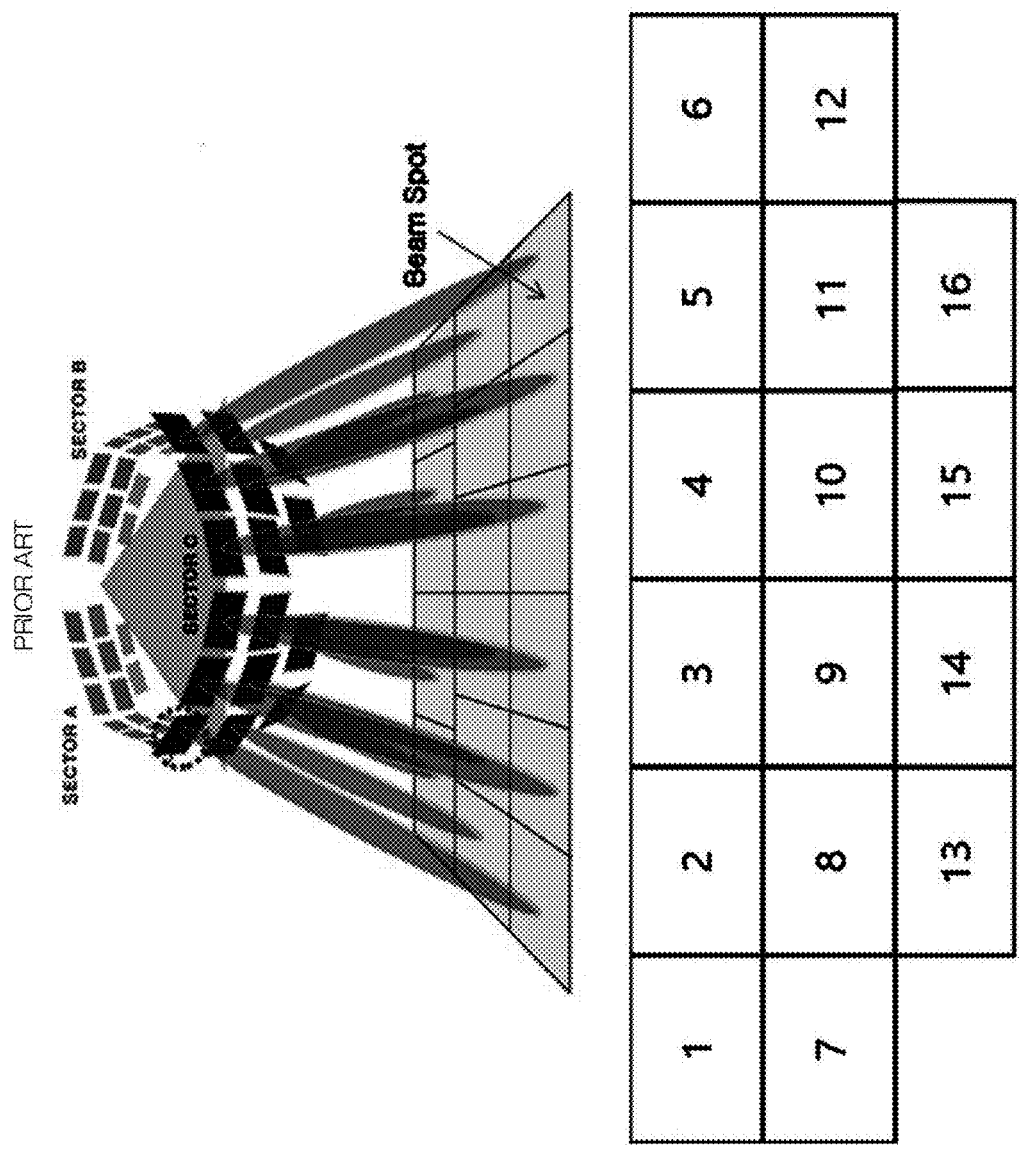
FIG. 1 is a diagram showing a configuration of a base station that is applicable to fifth generation (5G) mobile communication.
Figure 2:
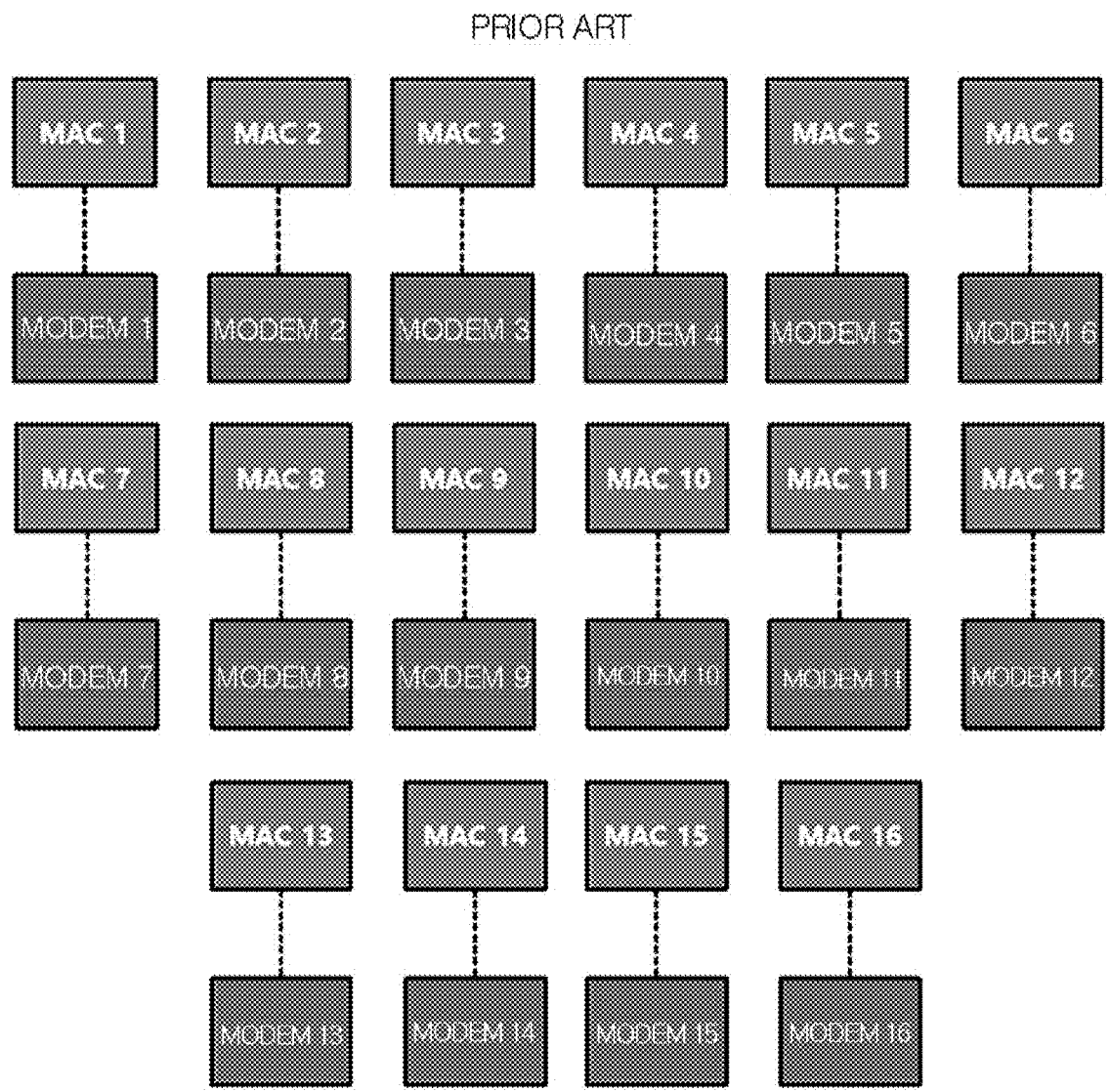
FIG. 2 shows a connection relationship between media access control processing units (MACs) and modems in 5G mobile communication.
Figure 3:
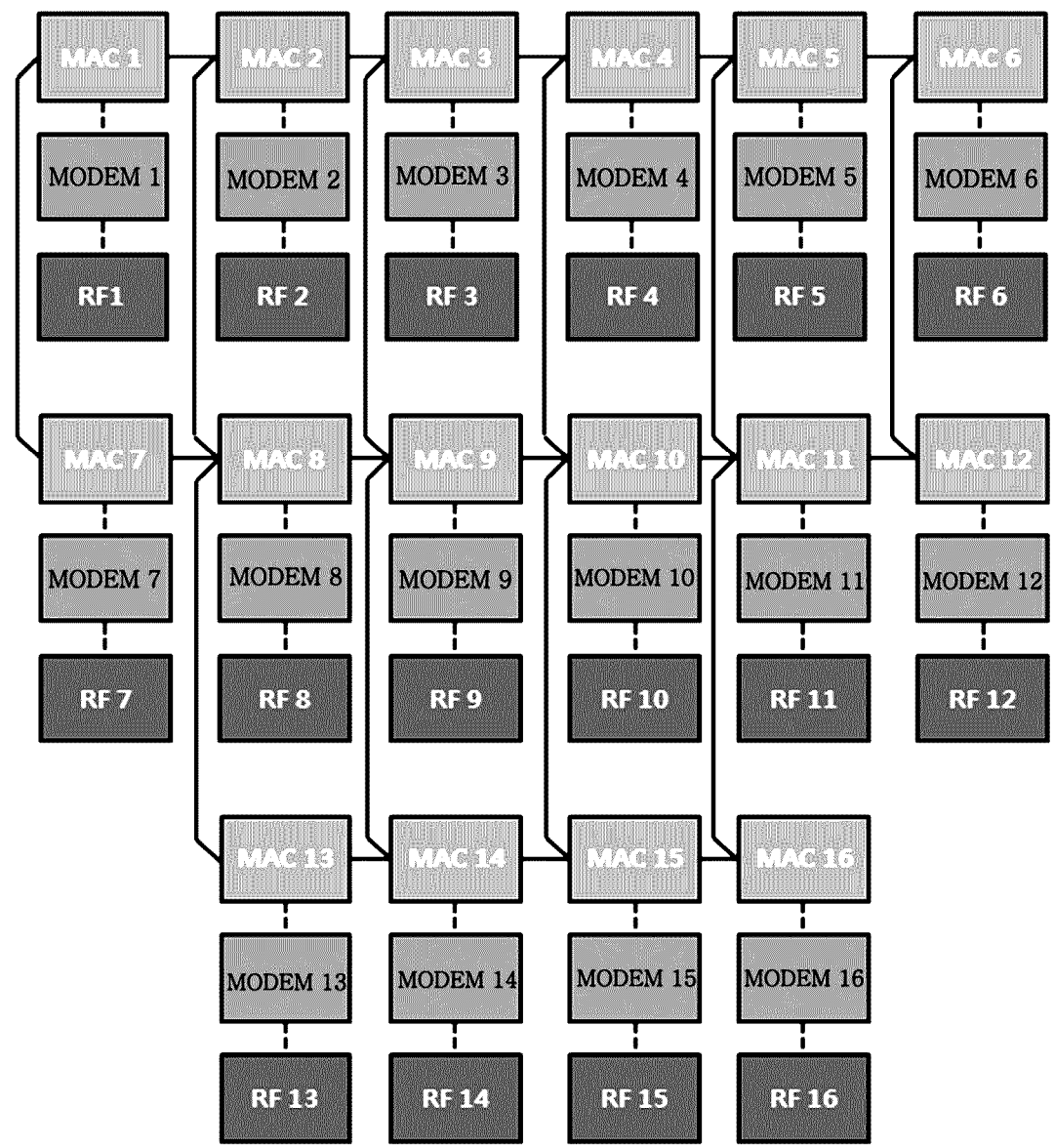
FIG. 3 is a diagram showing a connection relationship between MACs and modems in a 5G mobile communication system to which a method of controlling the power of a physical layer device of a base station according to an exemplary embodiment of the present invention can be applied.

FIG. 3 is a diagram showing a connection relationship between media access control processing units (MACs) and modems in a fifth generation (5G) mobile communication system to which a method of controlling a physical layer device of a base station according to an exemplary embodiment of the present invention can be applied. As shown in FIG. 3, a method of controlling the power of a physical layer device of a base station in a mobile communication system according to an exemplary embodiment of the present invention can be performed in a configuration, for example, in which modems and radio frequency (RF) modules that are physical layer devices constituting the lowermost level of base station equipment of a 5G mobile communication system, correspond to their beam spots on a one-to-one basis, and MACs are logically or physically connected to these physical layer devices on a one-to-one basis.

As indicated by solid lines, a plurality of MACs or all MACs belonging to the corresponding cell sector are connected to each other to additionally cover adjacent beam spots belonging to the cell sector, and thus can exchange the numbers of pieces of user equipment (UE) at beam spots managed by the MACs, information relating to traffic managed by the MACs, etc. with each other.

Figure 4:
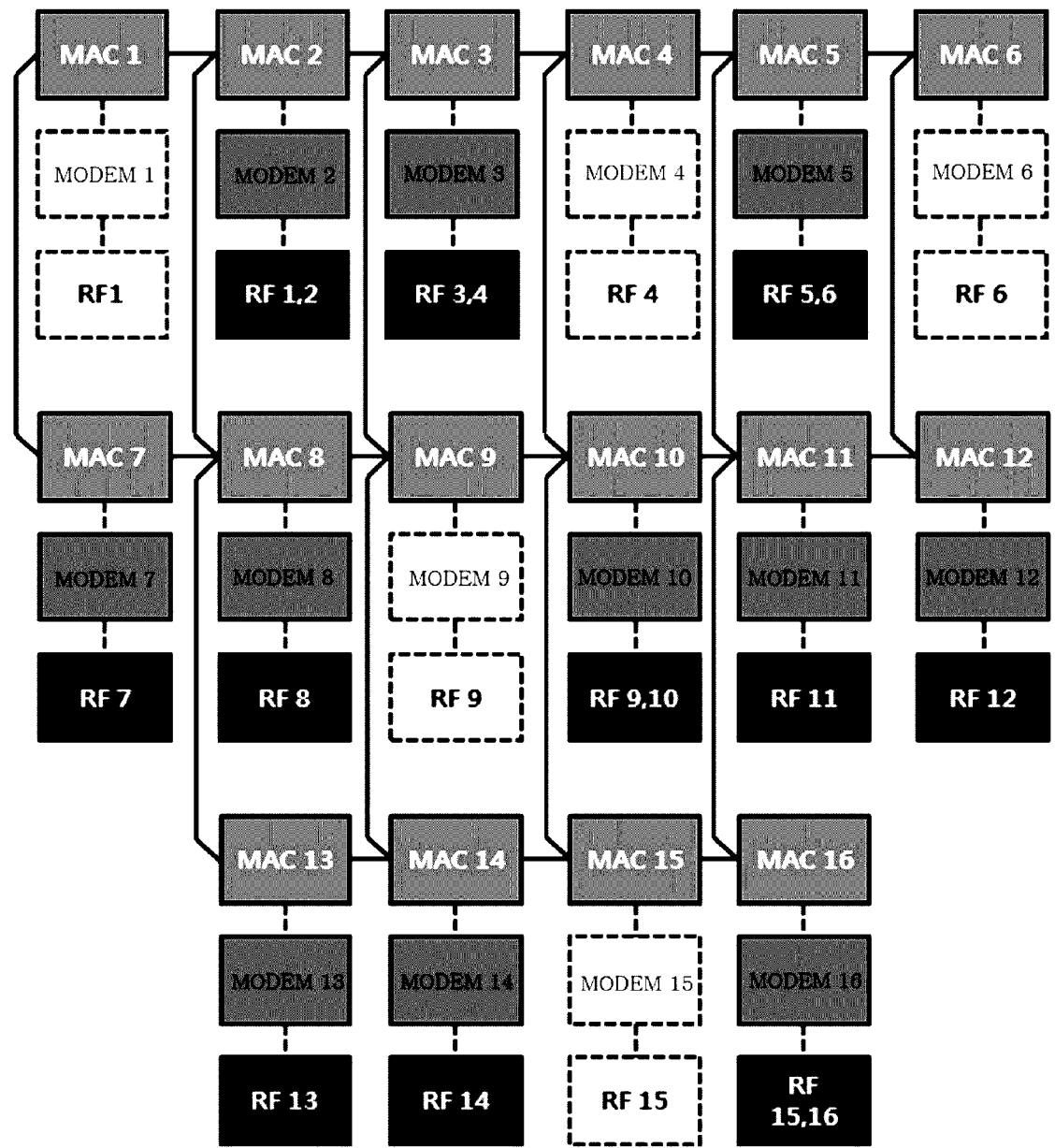
FIG. 4 is a diagram illustrating results of turning off the power of physical layer devices corresponding to arbitrary beam spots based on a method according to an exemplary embodiment of the present invention.
Figure 5A:
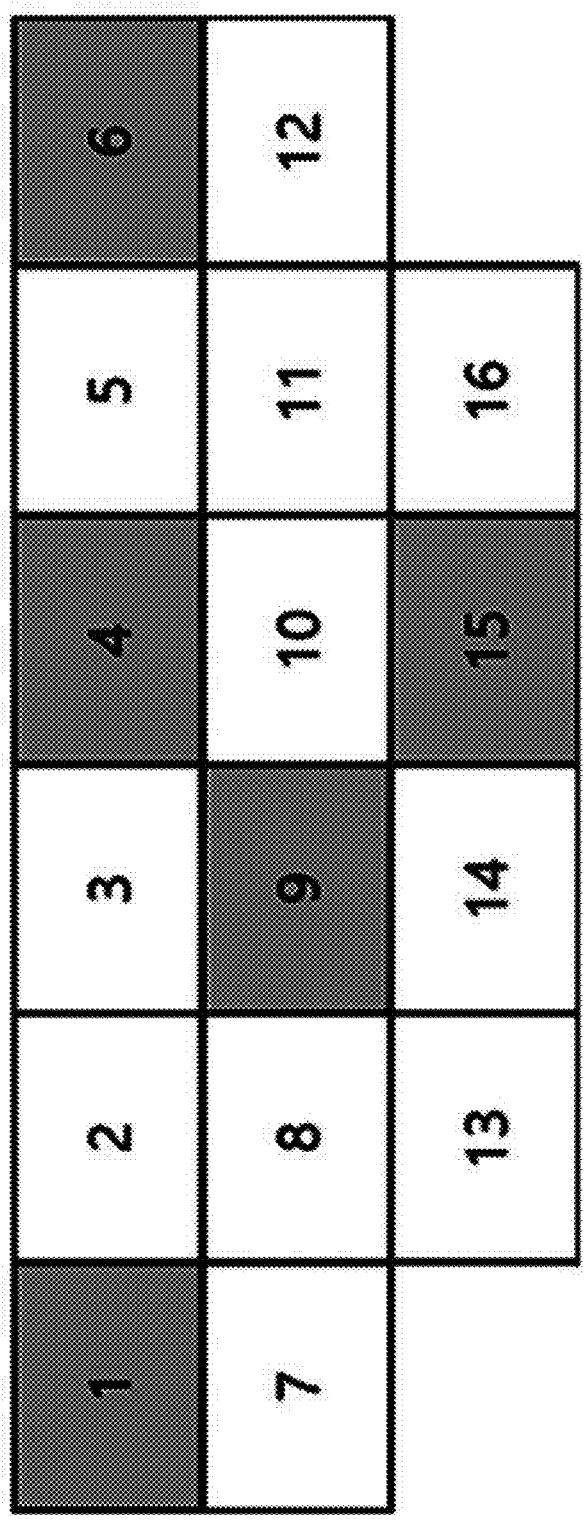
FIGS. 5A and 5B are diagrams respectively showing beam spots satisfying a power-off condition according to the power control method exemplified in FIG. 4 and the coverage areas of respective physical layer devices changed accordingly.
Figure 5B:
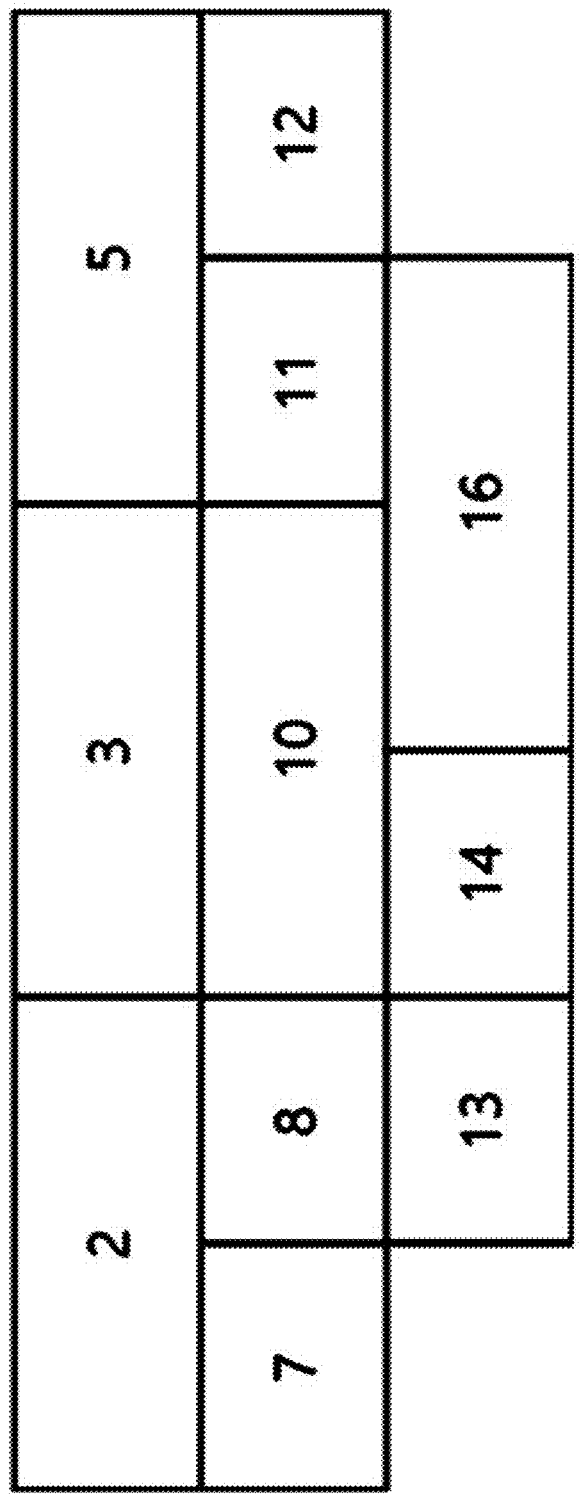

FIG. 4 is a diagram illustrating results of turning off the power of physical layer devices corresponding to arbitrary beam spots based on a method according to an exemplary embodiment of the present invention. FIGS. 5A and 5B are diagrams respectively showing beam spots satisfying a power-off condition according to the power control method exemplified in FIG. 4 and the coverage areas of respective physical layer devices changed accordingly. First, when the numbers of pieces of UE at first, fourth, sixth, ninth, and 15$^{th}$ beam spots in a mobile communication base station system configured as shown in FIG. 3 are smaller than a UE number reference value and total amounts of traffic of all UE at the respective beam spots are smaller than a traffic amount reference value, the power of the corresponding physical layer devices is turned off (see blocks indicated by dotted lines) as shown in FIG. 4, and neighboring physical layer devices are caused to manage the corresponding beam spots in an integrated manner.

In other words, when the numbers of pieces of UE at first, fourth, sixth, ninth, and 15$^{th}$ beam spots are smaller than the UE number reference value and total amounts of traffic of all UE at the respective beam spots are smaller than the traffic amount reference value as shown in FIG. 5A, physical layer devices managing second, third, fifth, tenth, and 16$^{th}$ beam spots, which are adjacent beam spots, additionally cover the adjacent beam spots at which the power of the physical layer devices has been turned off by adjusting antenna beam angles as shown in FIG. 5B. In this state, when the number of pieces of UE at an adjacent beam spot or a total amount of traffic of the pieces of UE exceeds the corresponding reference value, an MAC of the corresponding beam spot is notified that the number of pieces of UE or the total amount of traffic exceeds the corresponding reference value and turns on the power of physical layer devices again, so that the physical layer devices of the corresponding beam spot cover the beam spot again.

Figure 6:
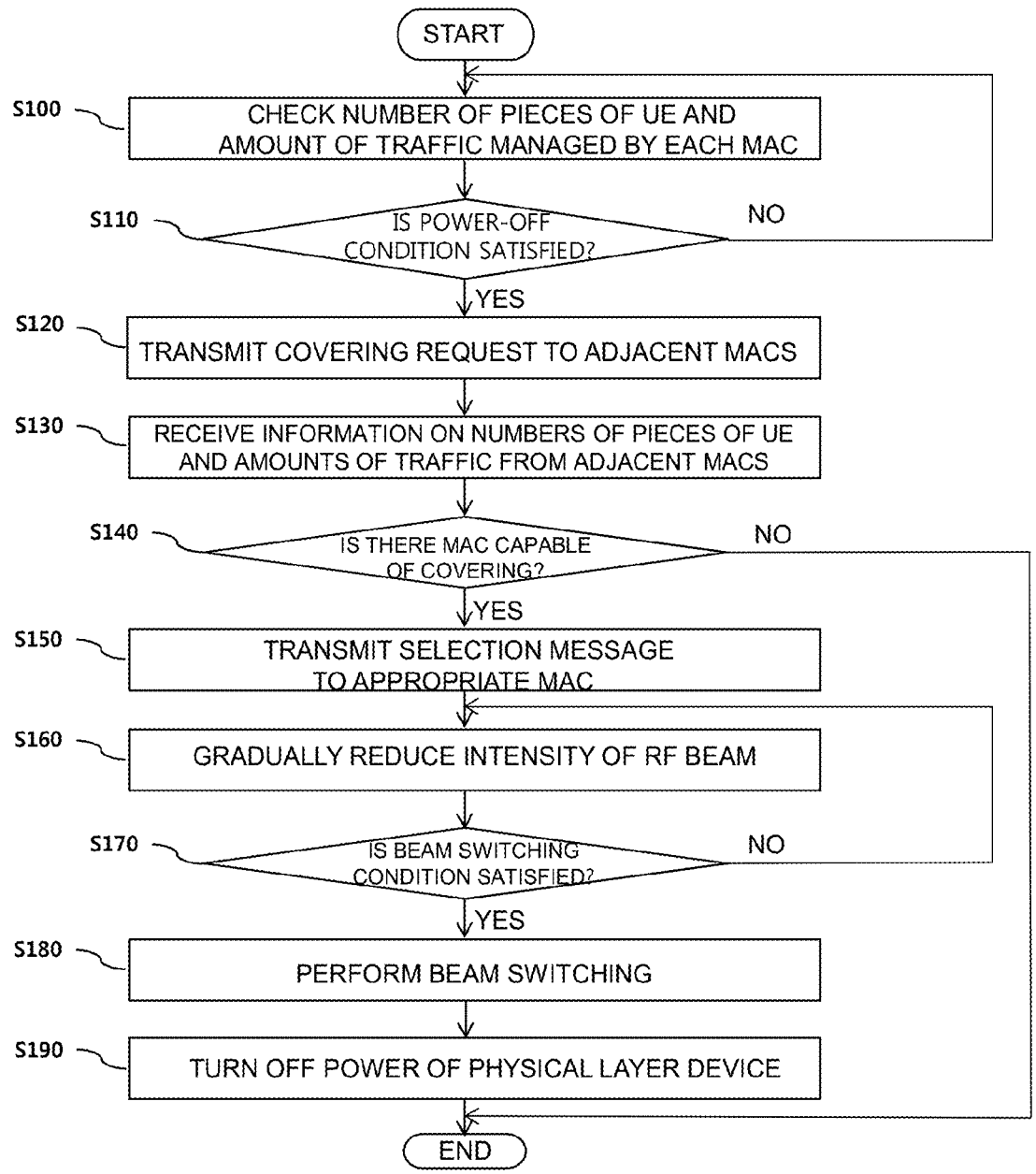
FIG. 6 is a flowchart illustrating a process of turning off the power of a physical layer device in a method of controlling the power of a physical layer device of a base station in a mobile communication system according to an exemplary embodiment of the present invention.

FIG. 6 is a flowchart illustrating a process of turning off the power of a physical layer device in a method of controlling the power of a physical layer device of a base station in a mobile communication system according to an exemplary embodiment of the present invention, and the process can be performed by an MAC managing each beam spot. As shown in FIG. 6, in operation S100, each MAC checks the number of pieces of UE at a beam spot managed by the MAC and a total amount of traffic of all the UE. Then, in operation S110, each MAC determines whether a physical layer device corresponding to the MAC satisfies a power-off condition.

Figure 7A:
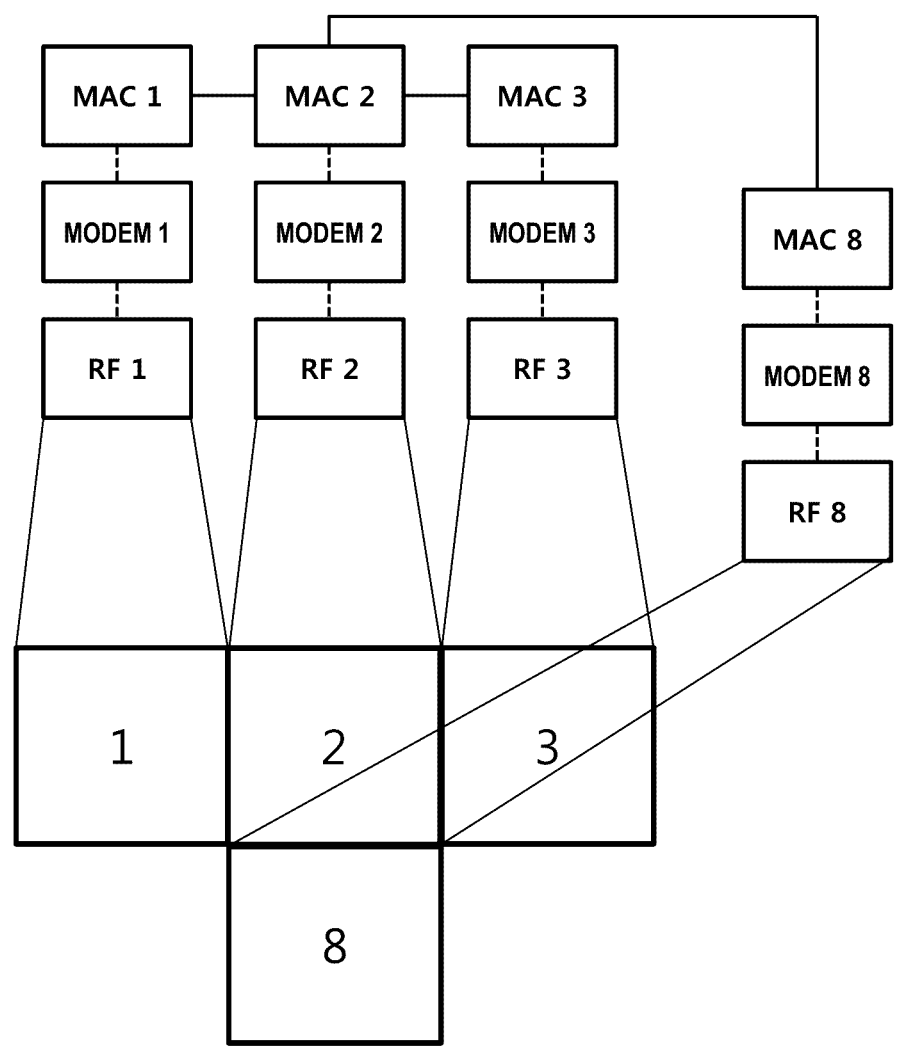
FIGS. 7A to 7E are diagrams illustrating the power-off process of FIG. 6.

FIGS. 7A to 7E are diagrams illustrating the power-off process of FIG. 6, showing only a configuration centering around a second beam spot and extracted from the configuration diagram of FIG. 3. As shown in FIG. 7A, beam spots adjacent to the second beam spot are the first, third, and eighth beam spots. FIGS. 7B to 7E have the same relationship as in FIG. 7A, but the configuration of the eighth beam spot is omitted in FIGS. 7B to 7E for convenience.

Figure 7B:
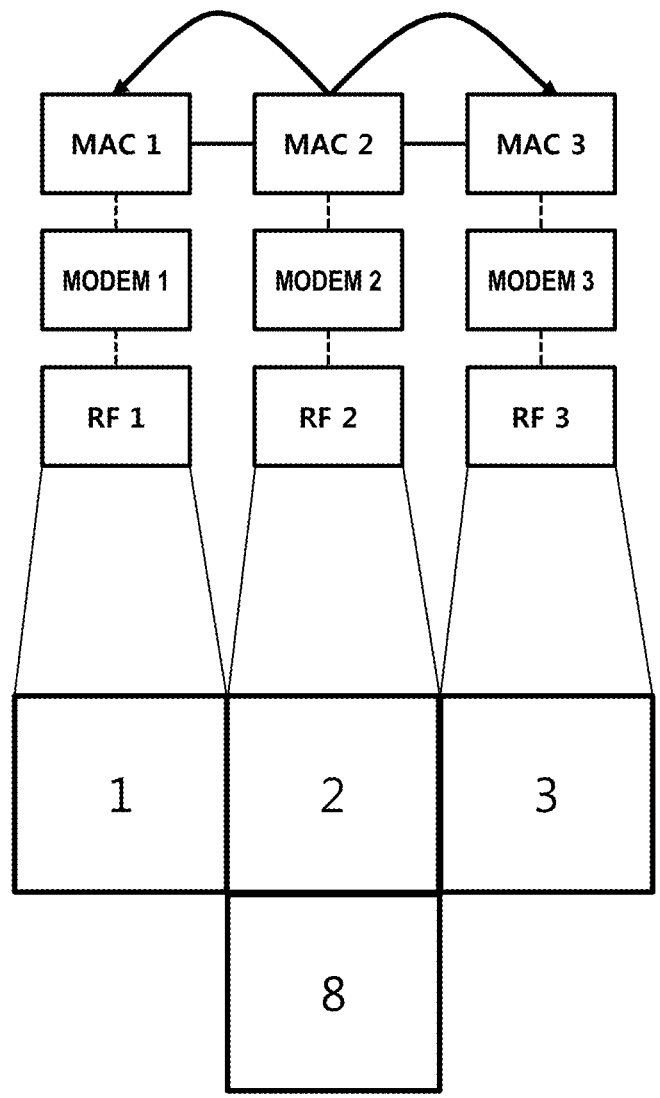

Referring back to FIG. 6, when it is determined in operation S110 that the power-off condition is not satisfied, the process returns to operation S100. On the other hand, when the power-off condition is satisfied, the process proceeds to operation S120, and the corresponding MAC transmits a covering request message for requesting covering of the beam spot of the MAC to adjacent MACs, that is, the first, third, and eighth MACs as shown in FIG. 7B. Here, the power-off condition can be set to be satisfied when the number of pieces of UE managed by the corresponding MAC is smaller than a predetermined UE number reference value and a total amount of traffic of all the UE is smaller than a predetermined traffic amount reference value.

Subsequently, the adjacent MACs from which covering has been requested by the second MAC, that is, the first, third, and eighth MACs, transmit acknowledgement (ACK) messages including information on the numbers of pieces of UE managed by the adjacent MACs and total amounts of traffic of all UE to the second MAC which is the covering-requesting MAC, and the second MAC receives the ACK messages in operation S130.

Next, in operation S140, the second MAC which is the covering-requesting MAC determines whether or not there is an MAC capable of covering among the adjacent MACs, and determines the most appropriate MAC when there are a plurality of MACs capable of covering. When there is an MAC capable of covering, the process proceeds to operation S150, and the second MAC transmits a selection message to the most appropriate MAC (hereinafter referred to as "plurally covering MAC"). In operation S150, for example, an MAC managing the smallest number of pieces of UE which have a total amount of traffic smaller than a coverable traffic-amount reference value may be the most appropriate MAC.

Figure 7C:
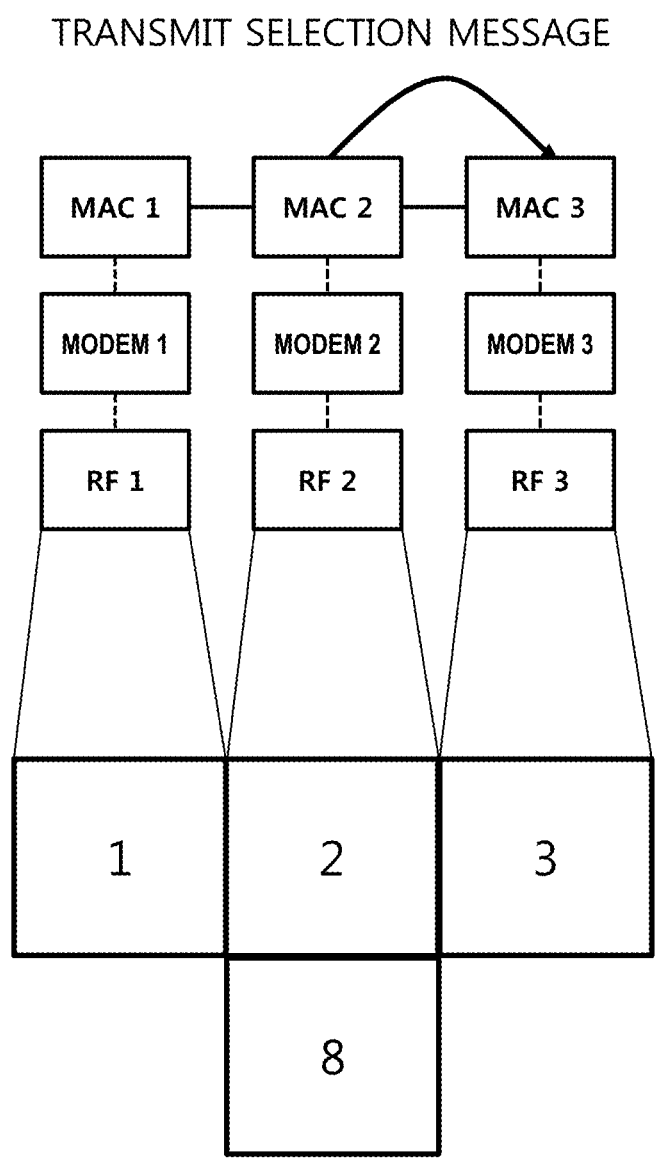

FIG. 7C shows a procedure in which the second MAC transmits a selection message to the third MAC when the third MAC is selected as the most appropriate MAC in the case of FIG. 7B.

Subsequently, the third MAC receiving the selection message adjusts the beam angle of an antenna of a third RF module managed by the third MAC so that the coverage area of the antenna extends to the second beam spot. In synchronization with this, in operation S160, the second MAC which is the covering-requesting MAC controls an antenna of a second RF module managed by the second MAC to gradually reduce the intensity of an RF beam of the second RF module. Next, in operation S170, the second MAC determines whether a beam switching condition is satisfied.

Figure 7D:
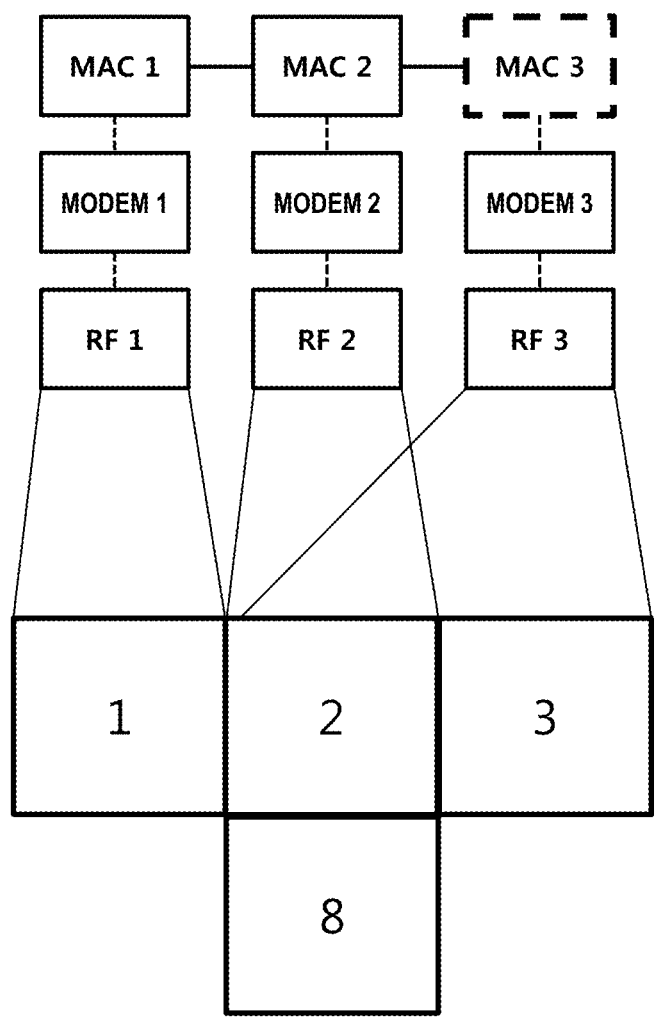
Figure 8:
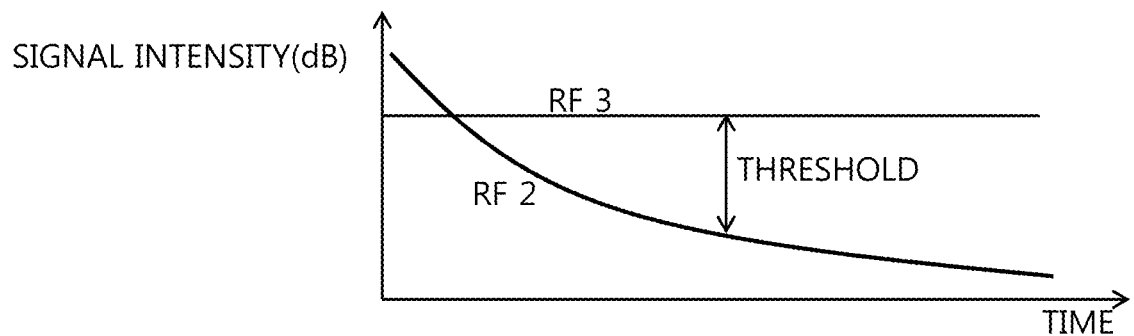
FIG. 8 is a graph illustrating a beam switching process in the power-off process of FIG. 6.

FIG. 8 is a graph illustrating a beam switching process in the power-off process of FIG. 6. As shown in FIG. 8, while the antenna beam angle of the third RF module managed by the third MAC is adjusted so that an antenna of the third RF module is directed toward the second beam spot, the intensity of the RF beam output from the second RF module managed by the second MAC is gradually reduced. In this state, as shown in FIG. 7D, both RF beams output from the second RF module and the third RF module cover the second beam spot.

In operation S170, whether or not a beam switching condition is satisfied can be determined depending on whether or not an intensity difference between RF beams output under the control of the covering-requesting MAC and the plurally covering MAC has reached a predetermined threshold.

Figure 7E:
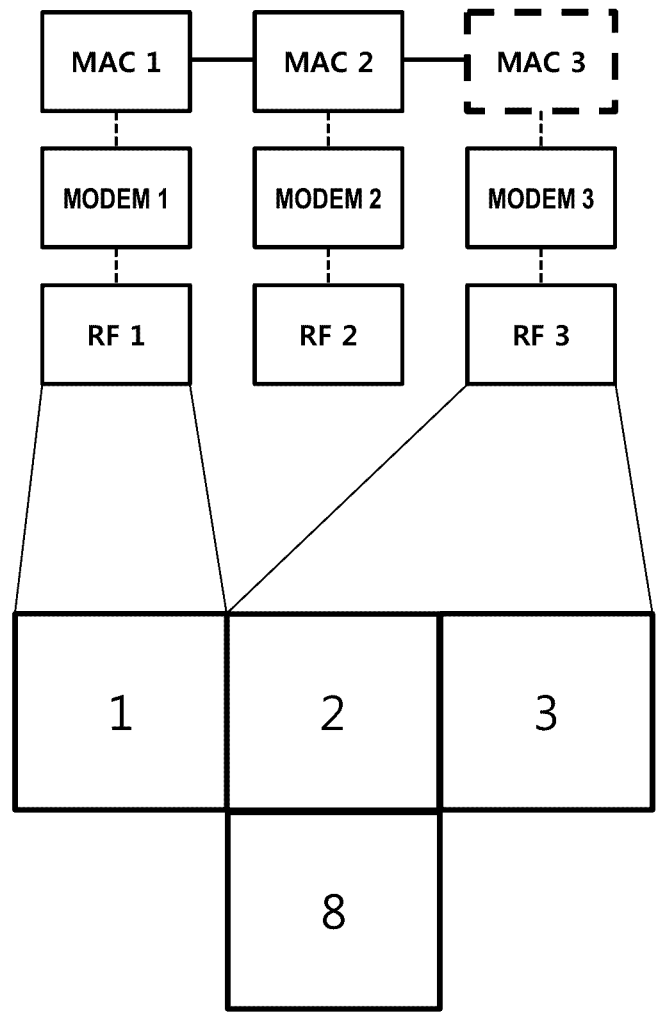

When it is determined in operation S170 that the beam switching condition is satisfied, that is, when the intensity difference between RF beams output under the control of the covering-requesting MAC and the plurally covering MAC has reached the predetermined threshold in FIG. 8, the process proceeds to operation S180, and beam switching is performed, that is, output of the beam antenna of the second RF module is stopped. In operation S190, the second MAC turns off the overall power of the second RF module and a second modem, thereby increasing the power use efficiency of a base station. FIG. 7E exemplifies a state in which the power of the second physical layer devices (including the MAC) is turned off and the RF beam output from the third RF module additionally covers the second beam spot.

Figure 9:
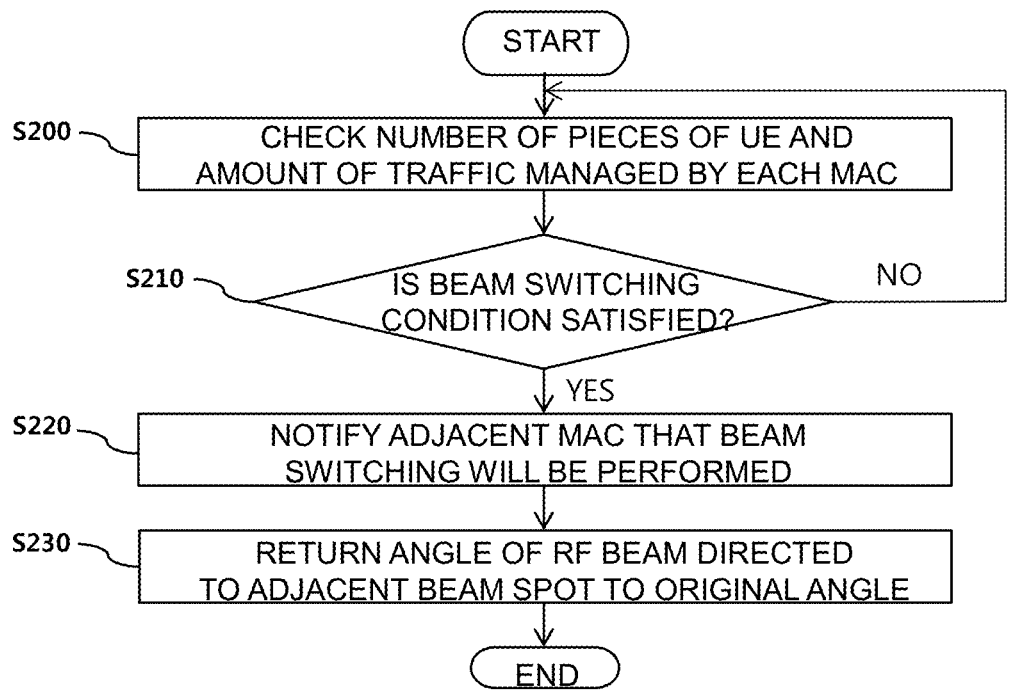
FIG. 9 is a flowchart illustrating a process of turning on the power of a physical layer device in a method of controlling the power of a physical layer device of a base station in a mobile communication system according to an exemplary embodiment of the present invention.

FIG. 9 is a flowchart illustrating a process of turning on the power of a physical layer device in a method of controlling the power of a physical layer device of a base station in a mobile communication system according to an exemplary embodiment of the present invention, and the process is performed by a plurally covering MAC. First, in operation S200, the plurally covering MAC checks the number of pieces of UE managed by the plurally covering MAC and a total amount of traffic of all the UE. In operation S210, the plurally covering MAC determines whether a beam switching condition is satisfied based on the information checked in operation S200. Here, the beam switching condition can be set to be satisfied when the number of pieces of UE managed by the plurally covering MAC exceeds a plurally covering UE number reference value and a total amount of traffic of all the UE exceeds a plurally covering traffic amount reference value.

Figure 10:
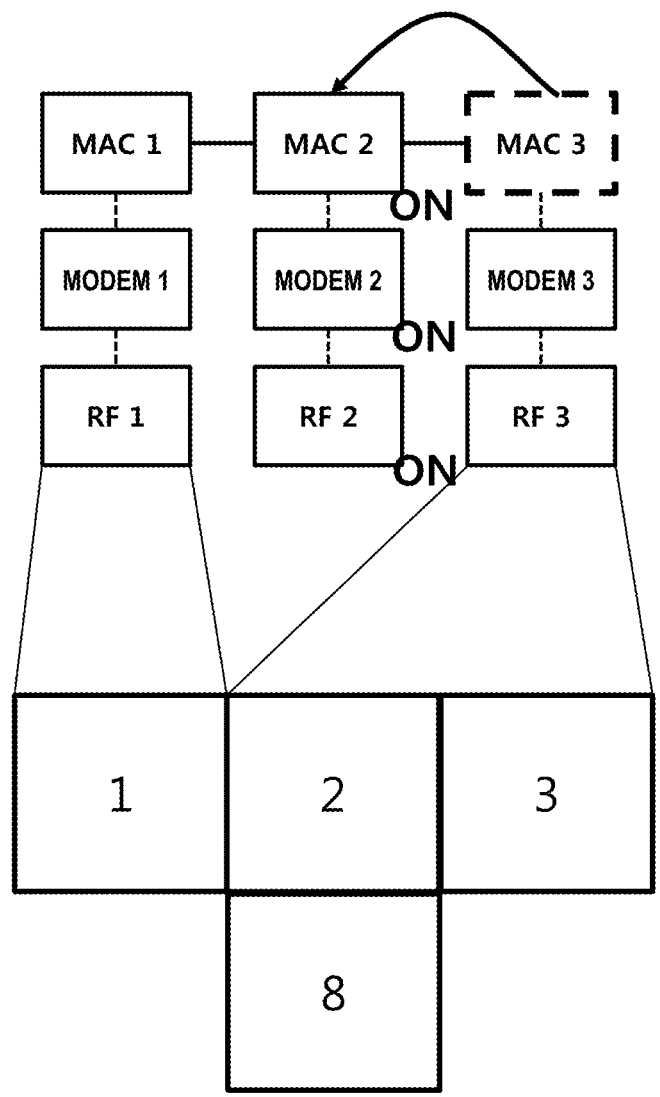
FIG. 10 is a graph illustrating the power-on process of FIG. 9.

FIG. 10 is a graph illustrating the power-on process of FIG. 9. Referring back to FIG. 9, when it is determined in operation S210 that the beam switching condition is not satisfied, the process returns to operation S200. On the other hand, when the beam switching condition is satisfied, the process proceeds to operation S220, and the plurally covering MAC notifies an adjacent MAC, that is, the second MAC which is a covering-requesting MAC, that beam switching will be performed as shown in FIG. 10. Then, the covering-requesting MAC immediately turns on the power of a second modem and a second RF module managed by the covering-requesting MAC. At the same time, the process proceeds to operation S230, and the plurally covering MAC adjusts the beam antenna angle of a third RF module managed by the plurally covering MAC to return to the original angle, that is, to cover only the third beam spot.

Thus far, a method of controlling the power of a physical layer device of a base station in a mobile communication system according to an exemplary embodiment of the present invention has been described in detail with reference to the accompanying drawings. However, this is a mere example, and it will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

For example, when the power of a physical layer device is controlled, only the power of an RF module rather than a modem may be controlled. In other words, a modem may be kept turned on, and only an RF module may be selectively turned on or off according to the number of pieces of UE and a total amount of traffic of all the UE.

Alternatively, when both a modem and an RF module are turned off, a management MAC, that is, a covering-requesting MAC, also may be kept in a sleep mode to additionally reduce power consumption. In this case, operation S220 may be replaced by an operation of waking the covering-requesting MAC up.

Meanwhile, in the exemplary embodiment described above, whether or not a power-off condition is satisfied is determined in consideration of both the number of pieces of UE and a total amount of traffic. However, alternatively, whether or not a power-off condition is satisfied may be determined based on only one of them, for example, the total amount of traffic.

In the exemplary embodiment described above, modems and RF modules correspond to each other on a one-to-one basis. However, alternatively, a plurality of RF modules may correspond to one modem. In this case, power control may be performed on only the RF modules, and may be additionally performed on the modem only when the power control of the modem does not cause any problem.

When a method of controlling the power of a physical layer device of a base station in a mobile communication system according to an exemplary embodiment of the present invention is applied to a 5G, that is the next generation, mobile communication system, if there are little or no UE at a specific beam spot, the power of a physical layer device managing the beam spot is turned off, and an adjacent physical layer device covers the beam spot. Therefore, it is possible to reduce power consumption.

What is claimed is:

1. A method of controlling power of a physical layer device of a base station in a mobile communication system including a plurality of media access control processing units (MACs) corresponding to a plurality of modems on a one-to-one basis and the plurality of modems each connected with one or more radio frequency (RF) modules covering beam spots dividing a base station cell, the method comprising:

operation (a) of checking, by each MAC, information relating to user equipment (UE) traffic managed by the MAC, and determining whether or not a physical layer device managed by the MAC satisfies a power-off condition based on a result of the checking;

operation (b) of, when it is determined in operation (a) that an arbitrary MAC satisfies the power-off condition, receiving, information relating to traffic managed by adjacent MACs from the adjacent MACs, and determining whether or not there is an MAC capable of covering based on the received information; and operation (c) of, when it is determined in operation (b) that there is an MAC capable of covering, requesting, by the MAC satisfying the power-off condition, the MAC capable of covering to cover a beam spot managed by the MAC satisfying the power-off condition, and then turning off power of a physical layer device managed by the MAC satisfying the power-off condition, wherein the MAC requested to cover the beam spot in operation (c) adjusts a beam antenna angle of an RF module managed by the MAC requested to cover the beam spot so that a beam antenna of the RF module is directed toward the beam spot for which the request has been made.

2. The method of claim 1, wherein the physical layer device whose power is turned off in operation (c) includes an RF module and a modem.

3. The method of claim 1, wherein operation (a) comprises whether or not the power-off condition is satisfied is determined in consideration of only a total amount of traffic or both a number of pieces of UE and the total amount of traffic, and the information relating to the UE traffic includes the number of pieces of UE and the total amount of traffic of all the pieces of UE.

4. The method of claim 1, wherein operation (b) comprises determining whether or not there is an MAC capable of covering in consideration of only total amounts of traffic managed by the adjacent MACs or both numbers of pieces of UE and the total amounts of traffic managed by the adjacent MACs.

5. The method of claim 1, wherein operation (b) comprises:

determining whether or not there is an MAC capable of covering according to whether or not a total amount of traffic is smaller than a coverable traffic-amount reference value; and determining an MAC managing a smallest number of pieces of UE as the MAC capable of covering when there are two or more MACs capable of covering.

6. The method of claim 1, wherein operation (c) further comprises, after requesting the MAC capable of covering to cover the beam spot, gradually reducing, by the covering-requesting MAC, intensity of an RF beam output from an RF module managed by the covering-requesting MAC, and then performing beam switching.

7. The method of claim 6, wherein operation (c) comprises performing, by the covering-requesting MAC, the beam switching when a difference between the intensity of the RF beam output from the RF module managed by the covering-requesting MAC and intensity of an RF beam output from an RF module managed by the MAC requested to cover the beam spot exceeds a threshold.

8. The method of claim 1, wherein the adjacent MACs are MACs managing beam spots on front, rear, left, and right sides of beam spots of the adjacent MACs.

9. The method of claim 8, wherein operation (c) further comprise turning off, by the MAC satisfying the power-off condition, the power of the physical layer device managed by the MAC satisfying the power-off condition, and then switching to a sleep mode.

10. The method of claim 8, wherein, when a total amount of traffic managed by the MAC requested to cover the beam spot exceeds a plurally covering traffic-amount reference value, the MAC requested to cover the beam spot notifies the covering-requesting MAC that beam switching will be performed, and then adjusts the beam antenna angle of the RF module managed by the MAC requested to cover the beam spot to an angle before the covering, and the covering-requesting MAC turns on the power of the physical layer device managed by the covering-requesting MAC after being notified that beam switching will be performed.

* * * * *